March 7, 1961 T. J. COLLIER 2,974,062
EPOXY-GLASS FIBER SYSTEMS AND METHOD FOR IMPROVING
THE BONDING RELATION THEREBETWEEN
Filed Feb. 14, 1956
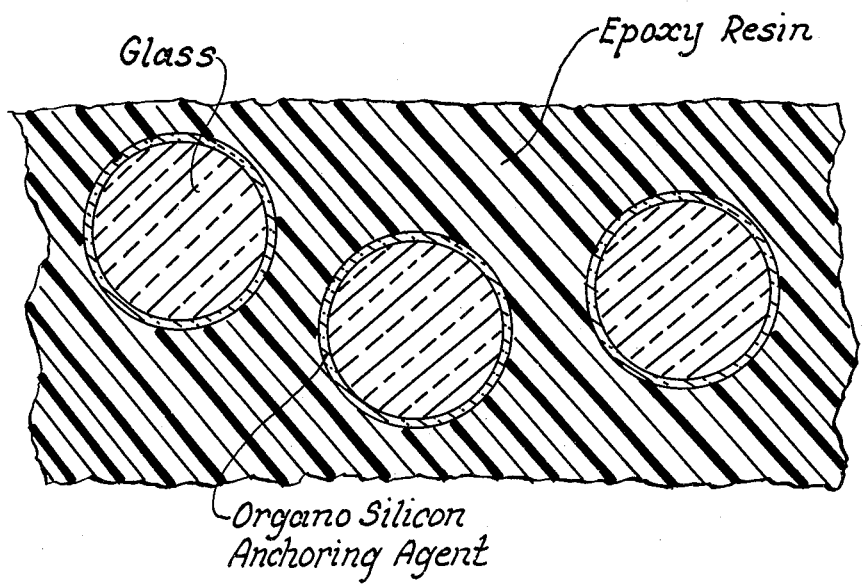
INVENTOR.
Theodore J. Collier
BY
Staelin and Overman
Attorneys

United States Patent Office 2,974,062
Patented Mar. 7, 1961

2,974,062

EPOXY-GLASS FIBER SYSTEMS AND METHOD FOR IMPROVING THE BONDING RELATION THEREBETWEEN

Theodore J. Collier, Newark, Ohio, assignor to Owens-Corning Fiberglas Corporation, a corporation of Delaware Filed Feb. 14, 1956, Ser. No. 565,511

7 Claims. (Cl. 117—76)

This invention relates to the improvement in the bonding relationship between epoxy type resinous materials and the surfaces of glass fibers in the manufacture of glass fiber reinforced bonded, molded or coated structures.

As used herein, the term "glass fibers" will be used to indicate glass fibers of the continuous or staple type and strands, yarns, rovings, fabrics or textile materials formed thereof and flexible films of glass. While not equivalent to such glass fiber elements and the properties of glass fibers which necessitate the development of this invention, it will be understood that the inventive concepts described and claimed herein will also find beneficial use to enhance the bonding relationship between epoxy resins and siliceous or mineral fibers.

As has now become well established, the surfaces of glass fibers are normally dominated by groupings which tend to produce a surface which is hydrophilic in character with the result that a strong bonding relationship between organic resinous materials and glass fibers is difficult to develop. Whatever bonding can be developed by physical or chemical attachment is diminished greatly by an intervening film of water which preferentially forms on the glass fiber surfaces upon exposure to high humidity or moisture. If it were possible to secure physical anchorage of the organic resinous materials to the glass fiber surfaces as by physical attachment through pores in the fibers or roughness on the surface, as is available in natural fibers, then the dominance of the hydrophilic groups on the surfaces of the glass fibers would offer little by way of a barrier to the establishment of a proper anchoring relationship between the glass fibers and the resinous materials for fuller utilization of the strength properties of the glass fibers. However, in the formation of glass fibers by the rapid attenuation of molten streams of glass, the streams tend to form into solid, rod-like elements having smooth surfaces to which little, if any, physical attachment is possible.

As a result, the development of a bonding relationship between the resinous materials and the surfaces of the glass fibers depends chiefly upon the availability of chemical forces on the glass fiber surfaces. Development of surface roughness on the glass fibers for physical anchorage is not possible because of the extremely fine dimensions of the glass fibers and the development of surface roughness by etching or by abrasion would tend to destroy the fibers and greatly to diminish the strengths thereof. Thus the problem in the development of a strong bonding relationship between the surfaces of glass fibers and resinous materials depends upon the ability to develop a suitable modification of the chemical forces available on the glass fiber surfaces. An even more difficult problem arises in the combination of glass fibers with the epoxy type resins because of the further differences that exist between this specific group of materials and resinous materials in general.

It is an object of this invention to produce and to provide a method of producing a strong and permanent bonding relationship between epoxy type resinous materials and systems formed thereof with the surfaces of glass fibers and it is a related object to produce and to provide a method for producing a system for use in the manufacture of glass fiber-epoxy resin combinations having a strong bonding relationship therebetween to achieve fuller utilization of the strength properties of the glass fibers in the structure that is formed.

In the drawing, the figure is a schematic sectional view of a system embodying the features of this invention.

Improvement in the bonding relationship between glass fibers and other resinous materials has been achieved as illustrated by the treatments effected in accordance with the teachings of the Steinman Patent No. 2,563,288 and the Biefeld Patents No. 2,683,097 and No. 2,723,210. In the aforementioned patents, modification of the glass fiber surfaces to improve the anchorage of resinous materials is achieved by the treatment of the glass fibers with organo silicon compounds having an organic group attached directly to the silicon atom wherein the organic group has less than 7 carbon atoms in aliphatic arrangement and is formed with a functional group such as an unsaturated carbon to carbon linkage, or a polar group, or a highly negative group or a labile hydrogen atom closely associated to an activating group. Similarly, in the Steinman Patent No. 2,552,910, description is made further of the modification of glass fiber surfaces to increase the bonding relationship between the surfaces and resinous materials by the treatment of the glass fibers with an organic chromic complex formed of a trivalent nuclear chromium atom having a carboxylato group coordinated with the trivalent nuclear chromium atom containing an organic group having less than 7 carbon atoms in aliphatic arrangement and formed with a highly functional group.

While the Werner complex compounds and the organo silicon compounds of the types described in the aforementioned Steinman and Biefeld patents are effective to improve the bonding relationship between glass fibers and resinous materials generally, the improvement in bonding appears to be greatest in the combinations of glass fibers with resinous polymers formed by addition polymerization through ethylenic linkages. Such resinous materials are represented by the unsaturated polyester resins, polystyrene, polyethylene, polyalkyl acrylates, and the like. Equivalent improvements are not available in the combinations which make use of glass fibers and epoxy resins as adhesives or the like.

It has been found, in accordance with the practice of this invention, that the bonding relationship between the surfaces of glass fibers and this specific group of epoxy type of resinous materials can be markedly increased when the organic group of the organo silicon compound or when the carboxylato group of the organic chromic complex compound is formed to contain an available amido, organic amido, acid, or acid anhydride, as represented by the following groups

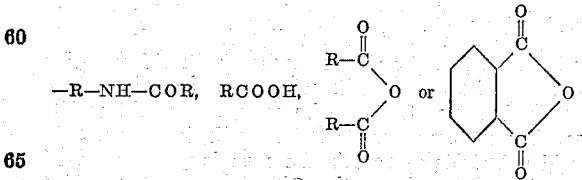

wherein R is an organic group in the form of an aliphatic, aromatic, mixed aliphatic aromatic, or heterocyclic group. When aliphatic or mixed aliphatic aromatic, the aliphatic or alicyclic group may be branched or straight chained, saturated or unsaturated, or formed with or without modifying groups such as hydroxy, amino, halogen, nitro groups and the like. When aromatic or mixed aliphatic aromatic, the aromatic or allyl group may be saturated or unsaturated in the ring and the ring may be hydrogenated, halogenated or formed with other nitro, amino, cyano groups, or the like attached to the ring carbons.

The organo silicon compound may comprise the silane, its hydrolysis product (silanol) or its condensation polymerization product (polysiloxane) wherein the silane has at least one but not more than three hydrolyzable groups attached directly to the silicon atom such as alkoxy groups of the type ethoxy or methoxy or other hydrolyzable groups of the type such as an amine group or halogen group and in which an organic group of the type described is attached also to the silicon atom. The following are given by way of representation, but not by way of limitation, of some of the silanes which may be employed in the practice of this invention.

Anhydride compound:

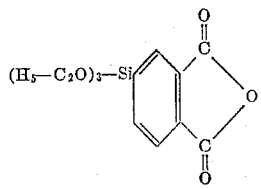

3-triethoxysilyl-phthalic anhydride

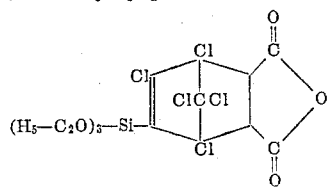

1,2,4,7,7-pentachloro 3-triethoxysilyl 5,6 dicarboxyl anhydride 2-norbornene

Acid compound:

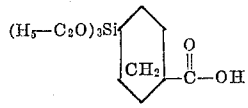

2-triethoxysilyl 5-carboxy norbornane

Amido compound:

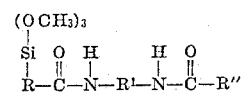

Trimethoxysilyl bis-(acetamido) methane
(When $R=CH_2$, $R'=CH_2$, $R''=CH_3$)

$$Cl_3Si-CH_2-\overset{O}{\overset{\|}{C}}-OH$$

Trichlorosilyl acetic acid

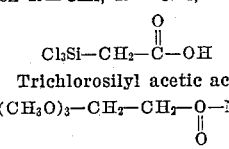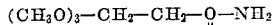

Trimethoxysilyl propionamide

It is preferred to pretreat the glass fibers in advance of their combination with the epoxy type resins and in a step separate and apart therefrom to modify the surfaces of the glass fibers whereby the surfaces become more receptive to the epoxy resins for enabling a better bonding relationship to be established. In this process, it is believed that the silicon atoms or the silicon oxide linkages of the organo silicon compound coordinate or otherwise become attached with groups that exist on the glass fiber surfaces and that the available amido, acid or acid anhydride present in the organic group attached to the silicon atom is reactive with the epoxy type resins so as permanently to tie in the epoxy resins with the glass fiber surfaces in a manner to effect a strong and permanent bonding relationship which is not disturbed to any marked extent in the presence of water or high humidity.

Similarly, the organic chromic complex compounds are believed to be capable of increasing the tie-in between the epoxy type resins and the surfaces of the glass fibers since the complexed chromium ion is believed to be capable of preferential attachment to form a part of the glass fiber surfaces or otherwise to become strongly coordinated therewith while the amido, acid or acid anhydride group in the carboxylato group joins with the epoxy resin upon application to tie in the resin with the glass fiber surfaces.

When applied alone onto the surfaces of the glass fibers, it will be sufficient if an amount is applied to cover the surfaces of the glass fibers with a monomolecular layer. While more can be applied, no marked improvements are secured by the presence of the anchoring agent on the glass fiber surfaces in thick films, such as might be made available by treatment of the glass fibers with a glass composition containing as much as 10 percent by weight of the organo silicon compound or the organic chromic complex compound. In practice, excellent results are secured by the treatment of the surfaces of the glass fibers with a composition containing the anchoring agent in an amount ranging from 0.005 to 5.0 percent by weight and best results are secured in the treatment of the glass fibers with a composition containing the organo silicon or the organic chromic complex in an amount within the range of 0.1 to 2.0 percent by weight.

Application can be made to the surfaces of the glass fibers at any time but best results are secured when the treatment is effected while the surfaces of the glass fibers are substantially free of the moisture film which naturally forms on the glass fiber surfaces upon standing and while the glass fiber surfaces are in their nascent or in their more active state immediately following formation of the glass fibers by attenuation of molten streams of glass. In the event that a size or other coating is present on the glass fiber surfaces, such materials which would intervene to prevent the intimate contact between the anchoring agent and the groupings to which the anchoring agent becomes attached on the glass fiber surfaces should be removed prior to the application of the organo silicon compound or the organic chromic complex so that the described reactions can be achieved to tie the anchoring agent to the glass fiber surfaces. Removal of previously applied size or coating compositions can be achieved by washing or by solution in solvents but it is preferred to burn the size from the glass fiber surfaces by heat treating the glass fibers at a temperature within the range of 900–1300° F. for a time ranging from a few seconds at the higher temperature to a few minutes at the lower temperature thereby to recreate the nascent stage for better tie-in of the anchoring agent with the glass fiber surfaces. Such heat treatment may be employed also to remove any moisture film which might be present on the glass fiber surfaces to provide nascent conditions.

The formulation for application of the anchoring agent to the glass fiber surfaces can be made by dissolving the organo silicon compound or the organic chromic complex in solvent systems using petroleum or hydrocarbon solvents for the organo silicon compound or ketones, ethers, esters or alcohols for the organic chromic complex. It is preferred, in the treatment of glass fibers, particularly when applied in connection with their forming operation or heat treatment, to make use of aqueous systems which are less expensive and safer to use and in which the described anchoring agents are either dissolved or emulsified. Aqueous solutions of the silanes can be effected by various means including the incorporation of the silane in aqueous medium adjusted to a pH above 4 and preferably to a pH within the range of 7–10 by the addition of ammonium hydroxide or other alkali metal base to form the corresponding siloxanolate or the like as described in the Biefeld Patent No. 2,723,210. Aqueous systems may also be formulated of the organo silicon compounds when the organo silicon compounds are highly dispersed in the aqueous medium, preferably when dispersed in the form of a solvent solution in alcohol or acetone in accordance with the process described in the pending application of Biefeld et al, Ser. No. 325,898.

The organic chromic complexes are generally soluble in aqueous medium, especially when adjusted by acetic acid to a low pH. Such organic chromic complexes become insolubilized upon the glass fiber surfaces upon drying.

Treatment to apply the anchoring agent can be carried out by various conventional means such as a flow coating process or by process of spray coating, roller coating, or by the conventional means for applying a size to the glass fiber surfaces through applicator pads or roller coaters or else by immersing the fibers or yarns, strands and fabrics formed thereof in a bath of the treating composition. The treated fibers may be allowed to air dry or drying can be accelerated more permanently to anchor the organo silicon compound on the organic chromic complex on the glass fiber surfaces by heat treatment such as at a temperature ranging from 200–450° F. for a time ranging from 3–15 minutes.

The following are illustrative of compositions embodying the features of this invention for use in the treatment of glass fibers to improve the bonding relationship capable of being established between the treated glass fibers and epoxy resins:

Example 1

1.0 percent by weight of the organo silicon compound having the following formula $$(H_5-C_2O)_3Si-\underset{CH_2}{\bigcirc}-\overset{O}{\underset{\|}{C}}-OH$$

99.0 percent by weight of water containing sufficient ammonium hydroxide to adjust the pH of the composition to about 8

Example 2

3.0 percent by weight of the organo silicon compound having the formula $$\underset{R-C-N-R^1-N-C-R}{\overset{(OCH_3)_3}{\underset{|}{Si}}\;\;O\;\;H\;\;\;\;\;\;H\;\;O}$$

97.0 percent by weight benzene and toluene in equal proportions

Example 3

1.5 percent by weight of the organo silicon compound having the formula $$(H_5-C_2O)_3-Si-\bigcirc\underset{\overset{\|}{O}}{\overset{\overset{\|}{O}}{\underset{C}{\overset{C}{\diagup}}}}O$$

4.0 percent by weight acetone
94.5 percent by weight water

In the above example, the organo silane is dissolved in the acetone and then the acetone is dispersed in the water with agitation while the water is maintained at a temperature below 60° F.

Example 4

2.0 percent by weight of the chrome complex in which the carboxylato group coordinated with the trivalent nuclear chromium atom contains the group COOH
5.0 percent by weight isopropyl alcohol
93.0 percent by weight water The compositions are applied by a pad or roll applicator to the glass fibers in forming and then dried at a temperature between 250–350° F. for 3–15 minutes.

The bonding relationship between the epoxy type resins and the surfaces of the glass fibers can be increased also when the organo silicon compound or when the organic chromic complex compound of the type described containing the acid, acid anhydride or amido group is formulated as a component in combination with the epoxy resin applied to the glass fiber surfaces in the systems formed of glass fibers and epoxy resins. When incorporated in combination to form a part of the epoxy resin system, the amount of the organo silicon compound or organic chromic complex will be greater than that employed in the treating composition for modification of the glass fiber surfaces separate and apart from the epoxy resin. In practice, anchoring agents in amounts ranging from 0.5–10.0 percent by weight are effective when used in combination with the epoxy resins to impart improved anchorage.

The following will illustrate the further concepts of this invention in the formulation of a resinous system for use in combinations with glass fibers:

Example 5

40.0 parts by weight epoxy resin
4.0 parts by weight of the organo silicon compound having the formula $$(H_5-C_2O)_3-Si-\underset{Cl}{\overset{Cl}{\bigcirc}}\underset{Cl}{\overset{Cl}{\bigcirc}}\underset{\overset{\|}{O}}{\overset{\overset{\|}{O}}{\underset{C}{\overset{C}{\diagup}}}}O$$

56.0 parts by weight water plus an emulsifying agent to form a stable system of the materials

Example 6

25.0 parts by weight epoxy resin
1.0 part by weight of an organic chromic complex in which the carboxylato group contains a group $$R-\overset{O}{\underset{\|}{C}}-\underset{|}{\overset{H}{N}}-R^1-\underset{|}{\overset{H}{N}}-\overset{O}{\underset{\|}{C}}-R$$

Water in amounts to form a 50% solution for use as an adhesive on the glass fibers It will be understood that the concepts of this invention may be practiced with various modifications in the manner for applying the described organo silicon compounds or the organic chromic complex compounds to the glass fiber surfaces alone or in combination with epoxy resins to achieve a strong and permanent bonding relationship and that changes may be made in the formulation and in the materials with which these anchoring agents are combined for treatment of the glass fibers such as by incorporating the anchoring agents as a component in a size composition applied to the glass fiber surfaces to improve their processing and performance characteristics and to enable a strong bonding relationship to be established by the epoxy resins and the sized glass fibers in the form of yarns, strands or fabrics with which the epoxy resins are combined.

It will be further understood that changes may be made in the details of formulation and application without departing from the spirit of the invention, especially as defined in the following claims.

I claim:

1. In an article of manufacture embodying the combination of glass fibers and epoxy type resins and wherein an anchoring agent is present on the glass fiber surfaces to improve the bonding relationship between the epoxy resins and the surface of the glass fibers, the improvement wherein the anchoring agent on the glass fiber surfaces is formed of a compound selected from the group consisting of a silane, its hydrolysis product, and its condensation polymerization product wherein the silane is formed with at least one hydrolyzable group attached directly to the silicon atom and with an organic group attached directly to the silicon atom containing a group selected from the group consisting of an amido, acid, and acid anhydride.

2. An article of manufacture as claimed in claim 2 in which the anchoring agent is present as a component in combination with the epoxy resins applied as a binder to the glass fiber surfaces and in which the anchoring agent is present in the epoxy resin in an amount ranging from 0.5 to 10% by weight thereof.

3. In an article of manufacture embodying the combination of glass fibers bonded with an epoxy resin and wherein an anchoring agent is present on the glass fiber surfaces to improve the bonding relationship between the epoxy resin and the glass fibers, the improvement wherein the anchoring agent, present as a thin layer on the glass fiber surfaces between the epoxy resin and the fibers, is formed of a compound selected from the group consisting of a silane, its hydrolysis product, and its condensation polymerization product wherein the silane is formed with at least one hydrolyzable group attached to the silicon atom and with an organic group attached directly to the silicon atom containing a group selected from the group consisting of an amido, acid, and acid anhydride.

4. In an article of manufacture embodying the combination of glass fibers with an epoxy resin employed as a binder therewith and wherein an anchoring agent is present on the glass fiber surfaces to improve the bonding relationship between the epoxy resin and the glass fibers, the improvement wherein the anchoring agent, in contact with nascent glass fiber surfaces, is formed of a compound selected from the group consisting of a silane, its hydrolysis product, and its condensation polymerization product wherein the silane is formed with at least one hydrolyzable group attached directly to the silicon atom and with an organic group attached directly to the silicon atom containing a group selected from the group consisting of an amido, acid, and acid anhydride.

5. In the method of manufacturing glass fiber-epoxy resin systems wherein the epoxy resin is applied to the fibers for bonding, the step of pretreating the fibers prior to the application of the epoxy resin to coat the fibers with a thin layer of a compound selected from the group consisting of a silane, its hydrolysis product, and its condensation polymerization product wherein the silane is formed with at least one hydrolyzable group attached directly to the silicon atom and with an organic group attached directly to the silicon atom containing a group selected from the group consisting of an amido, acid, and acid anhydride.

6. The method as claimed in claim 5 which includes the additional step of heating the glass fibers immediately prior to the application of the anchoring agent to a temperature for providing nascent conditions on the glass fiber surfaces.

7. The method as claimed in claim 5 in which the anchoring agent applied as a pretreatment to the glass fiber surfaces is applied in connection with the formation of the glass fibers by the rapid attenuation of molten streams of glass, and wherein the pretreatment is effected immediately following attenuation.

References Cited in the file of this patent

UNITED STATES PATENTS

| | | |
|---|---|---|
| 2,184,320 | Simpson | Dec. 26, 1939 |
| 2,390,370 | Hyde | Dec. 4, 1945 |
| 2,446,119 | White | July 27, 1948 |
| 2,541,027 | Bradley | Feb. 13, 1951 |
| 2,563,288 | Steinman | Aug. 7, 1951 |
| 2,604,688 | Slayter | July 29, 1952 |
| 2,610,198 | Sommer | Sept. 9, 1952 |
| 2,633,428 | Klug | Mar. 31, 1953 |
| 2,647,137 | Frisch et al. | July 28, 1953 |
| 2,649,396 | Witt et al. | Aug. 18, 1953 |
| 2,687,418 | Sommer | Aug. 24, 1954 |
| 2,699,415 | Nachtman | Jan. 11, 1955 |
| 2,720,470 | Erickson | Oct. 11, 1955 |
| 2,729,582 | Modigliani | Jan. 3, 1956 |
| 2,733,182 | Dalton et al. | Feb. 6, 1956 |
| 2,776,910 | Erickson | Jan. 8, 1957 |